United States Patent Office

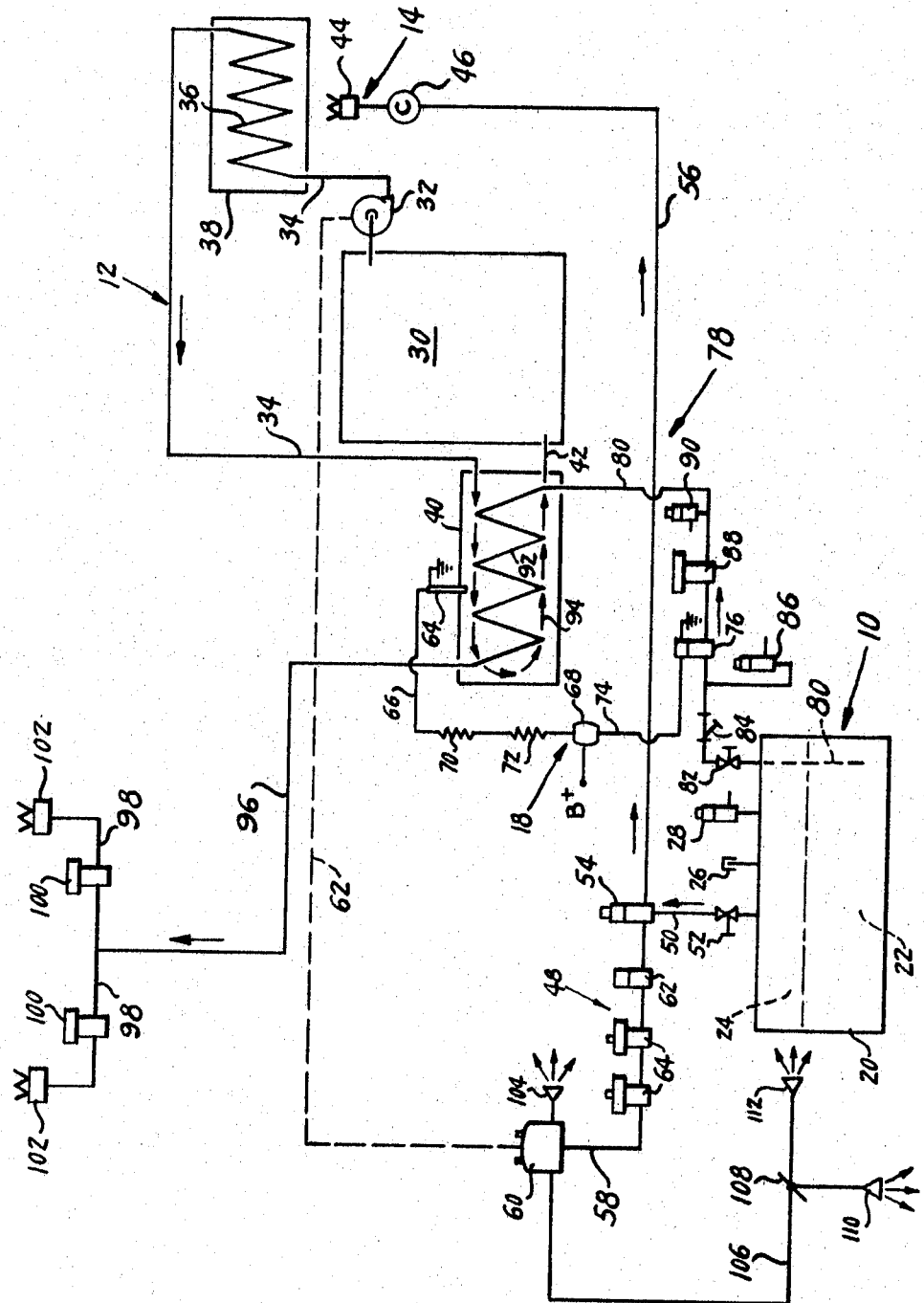

3,319,435
Patented May 16, 1967

3,319,435
LIQUEFIED PETROLEUM GAS VAPORIZATION SYSTEM
John A. Boyd, 1310 Holloman Road, Fairfax, Va. 22030, and Donald E. Boyd, 13316 Compton Road, Clifton, Va. 22024
Filed Mar. 28, 1966, Ser. No. 538,035
10 Claims. (Cl. 62—52)

This invention relates to a system which utilizes liquefied petroleum gas and more particularly it relates to an invention which increases the vaporization of such liquefied petroleum gas to thereby provide an increased volume of vapor, which is utilized as a fuel.

It is well known in the art that various types of hydrocarbons can be stored in the liquid state, and when such hydrocarbons vaporize, the vapor thereof can be used as a fuel. Products of this type are generally referred to as liquefied petroleum gases, or alternatively, as LP gases. As a general practice, a suitable storage tank is provided for storing the LP gases, and within the tank, the gas is in a liquid state at the bottom of the tank and a vapor state at the top thereof. Since it is the vapor which is commonly used as fuel, it is, of course, desirable to convert the liquid into a vapor at as rapid a rate as possible. However, for each particular type of LP gas, there is a certain latent heat of vaporization which must be applied to the liquid fuel to convert the same to a vapor. Naturally, ambient temperature conditions have a great effect on the vaporization rate of any particular LP storage tank. That is, in warmer weather, the walls of the storage tank are heated a certain amount merely due to the ambient temperature acting on the outside thereof, and accordingly, such heating serves to supply the heat required for vaporization of the liquid within the storage tank. However, particularly on winter days when the ambient temperature is quite cold, there is a very low rate of vaporization within the storage tank.

The present invention recognizes the fact that, under any conditions, a storage tank may fail to provide a sufficient quantity of vapor for a high output system requiring several hundred thousand B.t.u.'s of heating capacity. Naturally, under extremely cold weather conditions, this problem is merely aggravated, due to the fact that the vaporization rate of a storage tank is particularly low.

To a certain extent, the prior art recognized that it would be desirable to provide an increased amount of vaporization of LP gases, but the proposals for increasing such vaporization were generally unsatisfactory. One prime form of prior art proposal was to provide either a very large capacity storage tank, or several interconnected smaller storage tanks, so that the rate of vaporization of the storage tank means itself would be increased. Naturally, a proposal like this was not entirely satisfactory, due to the increased costs and the increased space requirements for the storage tank means. Another prior art proposal was to provide some means for heating the exterior of the storage tank itself, to thereby increase the vaporization rate of the LP gas within the tank. Such a technique did, in small part, increase the vaporization rate within the tank, but generally such increase was inadequate to meet a truly high capacity load wherein a high volume of vapor fuel was required. Still another prior art proposal suggested the removal of a small portion of liquid from the bottom of the tank to pass through some form of vaporizing means and to then be returned to the top of the tank as vapor which could ultimately be used as fuel. Again, a technique of this type was not altogether satisfactory, and although it did increase the vaporization rate somewhat, it could not provide a truly high capacity heating system with a sufficient quantity of vapor fuel.

With the foregoing matter firmly in mind, it is, therefore, an object of the present invention to overcome the difficulties and deficiencies associated with prior art techniques and proposals, and to provide in their stead a new and improved system for vaporizing LP gases.

Another object of the present invention is to provide a system for greatly increasing the vaporization rate of a conventional LP storage tank to thereby provide an adequate supply of vapor fuel which can run a very high capacity heating unit.

Another object of the present invention is to provide a system which utilizes both the vapor phase and the liquid phase of an LP storage tank to thereby create an extremely high volume of vaporized gas which can be supplied to a heating unit.

Another object of the present invention is to provide a system wherein the vapor phase of an LP storage tank is utilized to operate a separate heating system which, in turn, vaporizes the liquid LP gas from the storage tank and supplies the same as vapor to a heating system.

Another object of the present invention is to provide a completely automatic system which efficiently and economically increases the vaporization rate of an LP storage tank to thereby provide an extremely high volume of vaporized gas to be used as fuel.

Other objects, advantages and salient features of the present invention will become apparent from the following detailed description, which, taken in conjunction with the annexed drawing, discloses a preferred embodiment hereof.

Referring of the drawing, the sole figure thereof is a diagrammatic view of a system in accordance with the principles of the present invention.

In general, the present invention includes a storage tank means generally designated 10, a closed liquid loop system generally designated 12 remote from the storage tank, a heating means generally designated 14 associated with the closed loop 12 for heating the liquid therewithin, a main burner means generally designated 16, and a control means generally designated 18.

The storage tank 10 can be any suitable form of vessel or container and is preferably formed as a closed metallic body 20 adapted to contain LP gas therewithin. The LP gas within the body 20 is provided as a liquid 22 at the bottom thereof and as a vapor 24 at the top thereof. A fill pipe 26 is provided at the top of the body 20 to enable the LP gas, in its liquid state, to be introduced thereinto. The liquid 22 within the tank turns to vapor 24 when sufficient latent heat of vaporization is applied thereto, and the vapor 24 at the top of the tank is at a pressure exceeding that of atmospheric pressure. Accordingly, a relief valve 28 is provided for safety purposes.

Referring to the closed loop 12, it will be seen that the same includes a supply tank or reservoir 30 adapted to contain a fluid supply, preferably a liquid such as water. Circulating means such as pump 32 are provided for delivering the water through a pipe or conduit 34 having a coil portion 36 passing through a closed vessel 38 which acts as a pre-heater for the liquid. The pipe 34 continues from the pre-heater to a second closed vessel 40 which acts as a vaporizer. The water, as heated by the pre-heater 38, is fed into the vaporizer vessel 40 and is circulated therethrough in the direction shown by the arrows. Then, such water is returned via a line 42 to the supply means 30 thereof.

The vapor operated heating means includes a vapor gas burner 44 and a control 46 therefor. The vapor gas burner is juxtaposed to the pre-heater portion 48 of the closed loop 12 to thereby heat the water passing through the coil 36 so that the same is supplied to the vaporizer 40 in a heated state. As an exemplary form of burner means, the burner 44 can be a 300,000 B.t.u. vapor gas burner.

A first means generally designated 48 is provided for supplying the vapor 24 from the top of the storage tank means 10 to the heating means 14 to permit operation thereof and to thereby cause heating of the fluid within the closed loop 12. The means 48 includes a conduit or line 50 for tapping the vapor 24 from the top of the tank 20. The line 50 includes a gas cock or valve 52 which can remain closed until it is desired to set the system into operation. At such time, the cock 52 can be opened to permit the vapor 24 to pass through the conduit 50 to a high pressure regulator 54. A line or conduit 56 extends in one direction from the high pressure regulator 54 to the heating means 14 to thereby supply vapor to operate the burner 44 which, in turn, heats the fluid in the closed loop 12. Another pipe or conduit 58 extends oppositely from the high pressure regulator 54 to a vapor operated electrical generator means 60. A valve 62 and a pair of low pressure regulators 64 are provided in the line 58 between the high pressure regulator 54 and the generator 60.

When the vapor reaches the generator 60 and sets the same into operation, the generator acts as a 110 volt power supply. The electrical generator 60, for example, can be coupled with a turbine which is driven by the vapor phase 24, so that operation of the turbine causes appropriate driving of the generator 60.

The 110 volt output from the generator 60 is coupled, as shown schematically at 62, to the circulating water pump 32 which is electrically driven. Thus, operation of the electrical generator 60 sets the circulating pump 32 into operation to thereby circulate the fluid through the closed loop 12.

Considering now the control means 18, it will be seen that such control means includes a temperature sensitive current controlling element 64 which is at least partially in contact with the fluid flowing through the interior of the vaporizer vessel 40. The element 64 can be a thermocouple or a thermistor to cause a variation in current flow responsive to variation in temperature conditions within the vaporizer. An electrical lead line 66 couples the element 64 with a control device 68 which is normally supplied with a positive voltage. Resistor means 70 and 72 are provided along the lead line 66, and, if desired, at least one of these resistors can be a variable resistor. The control device 68 is electrically connected by lead line 74 to a solenoid operated valve 76. Proper selection of the resistors 70 and 72 serves to control the control device 68 to be responsive to a particular temperature as sensed by the element 64. The connection of the control means 18 is such that the solenoid operated valve 76 is normally in a closed condition, thereby preventing fluid flow therethrough. However, when the temperature of the fluid within the closed loop 12 reaches a predetermined level, such temperature causes a current flow which operates the control device 68 and which in turn opens the solenoid operated valve 76 to permit flow therethrough.

In an illustrative form of the invention, the B+ applied to the temperature controller 68 is 12 volts D.C. Similarly, the solenoid operated valve 76 has a 12 volt solenoid controllably forming a part thereof. The temperature sensitive element 64 is responsive to a temperature of 80° F. within the vaporizer vessel 40, at which temperature the control device 68 opens the solenoid operated valve 76 to permit flow therethrough.

The solenoid operated valve 76 is mounted within a means generally designated 78 which communicates between the liquid 22 in the storage tank 10 and the main burner means 16. The means 78 includes a flow line or conduit 80 extending between the vaporizer vessel 40 and the storage tank vessel 20. As shown, the open end of the conduit 80 is immersed in the liquid LP gas 22 contained in the bottom of the storage tank. A valve or cock 82 is provided in the line 80 adjacent the storage tank means 10, and when the system is set into operation, this cock can be opened so that the liquid can eventually flow from the storage tank means. A strainer 84 is also provided in the flow line 80 to assure that impurities or solid contaminants will not be fed to the main burner 16. A first pressure release valve 86 is provided in advance of the solenoid operated valve, to relieve any liquid pressure in the event that the solenoid operated valve 76 is in its closed condition. However, once the control device 68 opens the solenoid operated valve 76 so that the liquid 22 can flow therethrough, such liquid passes through a high pressure regulator 88 and is supplied to the vaporizer vessel 40. Another relief valve 90 is provided between the high pressure regulator 88 and the vaporizer vessel 40.

Within the vaporizer vessel 40, the liquid flow conduit 80 converts into a coil 92. The fluid flowing through the closed loop 12 passes across the outside of this coil 92, as illustrated by the arrows 94 which represent the flow path of the heated fluid within the closed loop 12 as the same passes through the vaporizer vessel 40. The heat of the fluid within the closed loop 12, as previously sensed by the control element 64, is sufficient to vaporize the liquid phase 22 as it passes through the coil 92, thereby converting the same into a vapor like the vapor 24. Another flow conduit 96 then takes this vapor from the coil 92 and supplies the same to the main burner means which is formed as a manifold, including a pair of legs 98, 98, each having a low pressure vapor regulator 100 mounted therein. After the vapor passes through the pressure regulators 100, it is supplied to vapor operated burners 102, which, for example, can each be a 600,000 B.t.u. vapor gas burner. Naturally, these main burners 102, 102 can be utilized for any desired purpose, and the objective of the present invention is to provide such burners with a sufficient quantity of vapor to assure continuous operation of the same.

To now consider the operation of the system which has so far been described, it should be apparent that the operator can set the system into operation merely by manually opening the valves or cocks 52 and 82. Since the solenoid operated valve 76 is normally closed, the liquid 22 within the tank 20 will not be initially supplied to the main burner means 16. However, the vapor 24 from the top of the storage tank 20 will be supplied to both the electrical generator means 60 and to the heating means 14. The generator 60, in turn, commences operation of the circulating pump 32 to circulate the water or other similar fluid in the closed loop 12. As such water circulates through the closed loop 12, it is heated by the heating means 14 and its temperature is accordingly gradually increased. When the temperature of such water reaches a proper level, as sensed by the control element 64, the control means 18 operates to permit the liquid 22 to be supplied from the storage tank 20. Specifically, the control device 68 opens the solenoid operated valve 76 and the liquid 22 can thus pass through the line 80 to the coil 92 which is disposed interiorly of the vaporizer 40. As the liquid passes through the coil 92, it is vaporized due to the latent heat of vaporization supplied by the surrounding water circulating through the closed loop 12. The vapor is then transmitted to the main burner means 16 to permit operation thereof. It should be apparent that the system of the present invention thus provides a means where the initial vapor 24 of the storage tank is used to heat the fluid within a closed loop 12. This closed loop 12 then provides the latent heat of vaporization necessary to convert the liquid 22 from the storage tank into a vapor, and as a result, an extremely high quantity of vapor can be supplied to the main burner means 16. This quantity of vapor far exceeds the vaporizing capacity of the storage tank means 10 itself. Also, it should be apparent that the present invention provides a means which automatically commences feeding of the liquid from the storage tank means, once the closed loop 12 has been raised to a temperature at which it will provide a satisfactory quantity of latent heat of vaporization.

As an ancillary feature of the present invention, let attention again be directed to the electrical generator means 60, which, as previously described, is set into operation by vapor 24 supplied from the storage tank means 10. The generator 60 can be, as aforementioned, driven by a turbine, or alternatively, the same can be driven by a vapor operated internal combustion engine. The engine exhaust gases can be exhausted to the atmosphere through a muffler 104, but in addition to these exhaust gases, there is a certain amount of exhaust hot air which is provided by the cooling fan associated with the generator 60. This hot air can be directed through a conduit 106 to a damper valve 108. When the ambient temperatures are fairly warm, as in summertime, and the atmosphere itself provides a certain amount of latent heat of vaporization to the exterior of the storage tank vessel 20, the damper can be directed to cause the hot air flow from the conduit 106 to exhaust through an outlet 110 to the atmosphere. However, in the wintertime, when the ambient temperature is quite cold, the atmosphere itself provides very little latent heat of vaporization to the exterior of the storage tank vessel 20. Thus, at this time, the damper 108 can be turned to direct the hot air from the conduit 106 through an outlet 112 which is juxtaposed to the exterior of the storage tank vessel 20. This hot air will thus serve to heat the walls of the storage tank and to thereby increase the vaporizing capacity of the storage tank means itself.

After reading the foregoing detailed description, it should be apparent that the objects set forth at the outset of the specification have been successfully achieved.

What is claimed is:

1. In a system for increasing the vaporization of LP gas supplied from an LP storage tank having a liquid supply at the bottom thereof and a vapor supply at the top thereof, the improvement which comprises:
   a closed loop having a fluid therein;
   a vapor operated heating means juxtaposed to a portion of said closed loop;
   first means for supplying vapor from said storage tank to said heating means for operation thereof to cause heating of the fluid in said closed loop;
   vapor operated main burner means;
   second means communicating between said liquid in said storage tank and said main burner means;
   said sceond means including a portion thereof passing through said closed loop; and
   control means operative, when said heating means raises the temperature of the fluid in said closed loop to a predetermined temperature, to transfer said liquid from said storage tank through said second means to said main burner means;
   said liquid being transferred through said second means becoming vaporized as it passes through said portion thereof, due to the heat of vaporization supplied by said heated fluid, with such vapor then being supplied to said main burner means for operation thereof.

2. The improvement defined in claim 1 wherein said first means includes a vapor operated electrical generator means.

3. The improvement defined in claim 2 wherein circulating means are provided for the fluid in said closed loop and wherein said generator means powers said circulating means.

4. The improvement defined in claim 2 wherein said control means is operated by said generator means.

5. The improvement defined in claim 1 wherein said closed loop contains first and second enlarged vessels, with said heating means being juxtaposed to said first enlarged vessel.

6. The improvement defined in claim 5 wherein said second means portion passes through said second vessel.

7. The improvement defined in claim 6 wherein said second means portion is formed as a coil.

8. The improvement defined in claim 1 wherein said second means includes a flow control device operative by said control means to permit liquid transfer from said storage tank.

9. The improvement defined in claim 8 wherein said control means includes a temperature sensor contacting the fluid in said closed loop, said sensor being controllably coupled with said flow control device.

10. The improvement defined in claim 1 wherein said first means includes a vapor operated electrical generator means and wherein selectively operable flow directing means are provided for directing the exhaust from said generator means onto the exterior of said storage tank.

References Cited by the Examiner
UNITED STATES PATENTS

| | | | |
|---|---|---|---|
| 1,752,167 | 3/1930 | Ford | 62—52 X |
| 2,335,837 | 11/1943 | Abramson | 62—52 X |
| 2,618,935 | 11/1952 | Malir | 62—52 X |

References Cited by the Applicant
UNITED STATES PATENTS

| | | |
|---|---|---|
| 2,142,065 | 12/1938 | Youngblood. |
| 2,265,110 | 12/1941 | Brauer. |
| 2,446,941 | 8/1948 | Martin. |
| 2,523,953 | 9/1950 | Johnson. |
| 2,550,886 | 5/1951 | Thompson. |
| 2,729,068 | 1/1956 | Mitchell. |
| 2,855,759 | 10/1958 | Chaiser et al. |

LLOYD L. KING, *Primary Examiner.*